US012392511B1

(12) United States Patent
Sands et al.

(10) Patent No.: US 12,392,511 B1
(45) Date of Patent: Aug. 19, 2025

(54) PERSONAL COOLING MISTING SYSTEM

(71) Applicants: Michael Edward Sands, Phoenix, AZ (US); Ronald Brian Laikind, Scottsdale, AZ (US)

(72) Inventors: Michael Edward Sands, Phoenix, AZ (US); Ronald Brian Laikind, Scottsdale, AZ (US)

(73) Assignee: Extreme Mist PCS, LLC, Scottsdale, AZ (US)

( * ) Notice: Subject to any disclaimer, the term of this patent is extended or adjusted under 35 U.S.C. 154(b) by 545 days.

(21) Appl. No.: 17/827,391

(22) Filed: May 27, 2022

Related U.S. Application Data

(63) Continuation-in-part of application No. 16/578,125, filed on Sep. 20, 2019, now abandoned.

(51) Int. Cl.

| | |
|---|---|
| ***F24F 6/14*** | (2006.01) |
| ***B05B 9/08*** | (2006.01) |
| ***F24F 5/00*** | (2006.01) |
| ***F24F 6/00*** | (2006.01) |
| ***F24F 11/89*** | (2018.01) |

(52) U.S. Cl.
CPC .............. *F24F 6/14* (2013.01); *B05B 9/0822* (2013.01); *F24F 5/0035* (2013.01); *F24F 11/89* (2018.01); *F24F 2006/008* (2013.01); *F24F 2221/12* (2013.01); *F24F 2221/38* (2013.01)

(58) Field of Classification Search
CPC ..... B05B 9/0822; F24F 2006/008; F24F 6/14; F24F 11/89; F24F 5/0035; F24F 2221/12; F24F 2221/38
USPC .......................................................... 239/373
See application file for complete search history.

(56) References Cited

U.S. PATENT DOCUMENTS

| | | | | |
|---|---|---|---|---|
| 4,815,635 A * | 3/1989 | Porter | B62J 11/10 | 74/551.8 |
| 5,595,451 A * | 1/1997 | Harrison, Jr. | B05B 1/00 | 401/136 |
| 10,603,680 B2 * | 3/2020 | Laikind | B05B 12/12 | |
| 2008/0006717 A1 * | 1/2008 | Junkel | A45F 3/16 | 239/302 |
| 2011/0180625 A1 * | 7/2011 | Rotondo | B05B 9/0861 | 239/152 |
| 2015/0150313 A1 * | 6/2015 | Huckins | A41D 13/0053 | 62/259.3 |
| 2016/0326765 A1 * | 11/2016 | Barbret | E04H 15/28 | |
| 2020/0281284 A1 * | 9/2020 | McAllister | A41D 13/0053 | |

* cited by examiner

*Primary Examiner* — Joseph A Greenlund
*Assistant Examiner* — Kevin Edward Schwartz
(74) *Attorney, Agent, or Firm* — Invention To Patent Services; Alex Hobson

(57) ABSTRACT

An improved personal cooling misting system having a dual 360 rotating articulating nozzle with an integrally formed purge valve. The improved personal cooling misting system provides for a wearable fluid reservoir to contain a volume of misting fluid, and an electrically operated pump proximate to the reservoir to pump the misting fluid from the reservoir to a misting head. The misting head facilitates atomizing the misting fluid. The improved system further provides for feed tubing to direct the misting fluid from the reservoir to the pump, and distributive tubing to direct the misting fluid from the pump to the misting head. The improved system also includes a pump control to control at least one of a pressure and a flow rate of the misting fluid.

17 Claims, 13 Drawing Sheets

PERSONAL COOLING MISTING SYSTEM

CROSS-REFERENCE TO RELATED APPLICATION

This patent application claims priority to non-provisional application Ser. No. 16/578,125 filed on Sep. 20, 2019, now pending.

TECHNICAL FIELD

This disclosure generally relates to cooling and misting systems. More specifically, this patent application discloses an article of clothing that incorporates a cooling and misting system designed to provide cooling and misting for a user wearing the article of clothing to combat excessive heat and/or to deter dehydration.

BACKGROUND

Individuals often seek ways to stay cool when exposed to elevated ambient temperatures. For example, staying cool and maintaining body temperature is essential in climates of extreme heat, for example, within desert regions and even seasonal environmental regions during peak summer months. Dynamic, or even passive activities for even a short period of time amid such conditions can be dangerous if the individual fails to maintain body temperature and/or remain hydrated. While the body provides its own natural cooling mechanism through sweating, which at the skin surface provides cooling as the sweat evaporates, the body can become overheated if it is exposed to excessive heat and/or exerted at elevated activity rates for extended periods of time. What is needed is a personal cooling and misting system incorporated within an article of clothing to compliment the body's natural cooling.

While cooling and misting systems are known in the art, the state of the art fails to provide for a personal cooling and misting system incorporated within an article of clothing that provides for all of the following; effectiveness, ease of use by a user, passive, and controllable. There is a significant need to facilitate cooling when a person is working in an environment which lacks shade and exposes a person to the sun and heat. This is especially true for workers engaged in safety operations such as road work, repairing power lines and other activities where a safety vest with bright reflective outer layers is used.

There is a significant need for an apparatus which addresses the problems identified above.

SUMMARY OF THE INVENTION

The present invention is a unique solution for providing a cooling and misting system that comprises incorporating a unique self-contained misting system which is entirely retained within an article of clothing such as a safety vest (also referred to as a high visibility vest) or hiking vest. In addition to including an incorporated water reservoir from which a water transfer tube is fluidly connected to a pump which has a separate fluid line connected to a spray nozzle. The present invention further includes a programmable computer chip to accommodate various conditions and users.

An embodiment of the present invention includes a fluid reservoir dimensioned and contoured within an article of clothing for a user to wear and carry the fluid reservoir, wherein the fluid reservoir accommodates a volume of a misting fluid. The present invention further includes an electrically operated pump to pump the fluid from the fluid reservoir to a spray nozzle which functions as a misting head. The electrically operated pump is dimensionally configured for integration within an article of clothing. The electrically operated pump is also placed within the article of clothing so that it is proximate to the dimensioned and contoured fluid reservoir. In addition, in an embodiment of the present invention, the reservoir which contains primarily clean water, is removably affixed to the article of clothing by hook and loop fasteners or other removable fastening members which enable the water reservoir to be removed. In addition, the fluid inside the water reservoir is primarily clean water which can either be boiled and heated and sterilized and then after cooling, put into the reservoir or alternatively, can be cold water that is clean water and placed within the reservoir. In addition, the fluid reservoir is located on one part of the garment and the electrically operated pump is located on an opposite portion of the garment to provide proper balance when the garment is being worn. The electrically operated pump is selected from the group consisting of a piston pump and a diaphragm pump. The present invention system further comprises a plurality of tubing to direct misting fluid from the fluid reservoir to various portions of the system, such as to and from the pump, to a distribution misting head, to a drinking line, to secondary distribution portions, etc. For example, the system comprises feed tubing comprising a first feed tubing end coupled to the fluid reservoir and a second feed tubing end coupled to the electronically operated pump. The electrically operated pump causes fluid from the fluid reservoir to travel through the feed tubing from the fluid reservoir to the electrically operated pump. In addition, distribution tubing comprises a first distribution tubing end coupled to the electrically operated pump and a second distribution tubing end coupled to the spray nozzle. The electrically operated pump causes fluid to travel through the distribution tubing from the electrically operated pump to the spray nozzle. The spray nozzle includes a misting head which atomizes the fluid directed to it into a misting spray. In addition, the misting head is selected from the group consisting of a directionally manipulated misting head and a variably actuated misting head.

The present invention cooling and misting system incorporated into an article of clothing system further comprises a pump control to control at least one operation selected from the group consisting of a pressure, a flow rate, a timing rate and a misting distribution pattern of the misting fluid through at least one of the feed tubing and distributive tubing, and ultimately to the misting head. Various systems allow the misting distribution pattern to comprise at least one of a consistent misting emission, an intermittent misting emission, or various, selectable misting emission rates and/or patterns.

The present invention also includes a programmable circuit board to facilitate system control over attributes selected from the group consisting of the electrically operated pump, the pump control, and a key fob, wherein the key fob wirelessly communicates and manipulates at least one of the electrically operated pump, the pump control and/or the programmable circuit board.

The present invention cooling and misting system incorporated into an article of clothing includes embodiments selected from the group consisting of a fluid reservoir, which is dimensioned to be received by at least one storage compartment of an article of clothing, wherein the article of clothing facilitates wearing the fluid reservoir by the user, a drink line that taps into at least one of the feed tubing and the distribution tubing, and a. mechanical securing mechanism coupled to or proximate to the misting head, wherein the mechanical securing mechanism facilitates securing the misting head to the article of clothing. Additional features of embodiments of the present invention includes a biometric element attachable to the anatomy portion of the user to communicate to the programmable circuit board at least a physical measurement of the user, and wherein at least one of the electrically operated pump and the pump control operates in response to the physical measurement by the programmable circuit board. Another feature of the present invention includes an environmental sensor to relay at least a temperature to the programmable circuit board to facilitate altering the system's operation in response to changing environmental conditions.

Defined in detail, the present invention is a cooling and misting system comprising: (a) an article of clothing including at least an outer layer of fabric and an interior layer of fabric affixed to the outer layer of fabric with an interior chamber between at least a portion of the outer layer of fabric and the interior layer of fabric, at least the outer layer of fabric split along a front centerline to form a first half of the article of clothing with a first longitudinal connecting portion at the front centerline and a second half of the article of clothing with a second longitudinal connecting portion at the front centerline, a first multiplicity of spaced apart connecting fasteners affixed to the first longitudinal connecting portion and a mating aligned second multiplicity of spaced apart connecting fasteners affixed to the second longitudinal connecting portion, at least a first lapel on the first longitudinal connecting portion with an open centerline area between the first and second longitudinal connecting portions at the location of the at least first lapel; (b) a fluid reservoir removably retained within the article of clothing and removably affixed to an interior of the exterior layer of fabric and located within the chamber between the outer layer of fabric and the inner layer of fabric, the fluid reservoir including an opening facing a rear centerline portion of the outer layer of fabric and a closing cap closing the fluid reservoir opening, the closing cap accessible from a location exterior to the article of clothing; (c) an electrically operated pump removably retained within the chamber between the outer layer of fabric and the interior layer of fabric; (d) a spray nozzle affixed to the article of clothing with a spray nozzle tip directed to spray in front of and at an upper portion of the article of clothing; (e) a feed tubing fluidly interconnected between the fluid reservoir and the electrically operated pump, the feed tubing including a first feed tubing end coupled to the fluid reservoir, and a second feed tubing end coupled to the electrically operated pump;

(f) a distribution tubing fluidly interconnected between the electrically operated pump and the spray nozzle, the distribution tubing including a first distribution tubing end coupled to the electrically operated pump and a second distribution tubing end coupled to the misting head; and (g) a pump control to provide control selected from the group consisting of misting fluid pressure rate, misting fluid flow rate, and a misting fluid distribution pattern; (h) wherein, after the fluid reservoir is filled with fluid and the article of clothing is worn by a wearer with the spray nozzle directed to spray fluid converted to a misting spray in front of a wearer's face, when the electrically operated pump is turned on, fluid is transported through the feed tubing from the fluid reservoir to the electrically operated pump and the fluid is transported through the distribution tubing from the electrically operated pump to the spray nozzle with a fluid spray mist ejected from the spray nozzle to a location in front of the wearer's face to enable the wearer to walk into the misting spray.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

A fundamental innovation of the present invention is to incorporate all of the key components of a cooling and misting system into an article of clothing to produce a cooling water mist spray in front of a wearer of the article of clothing so that the wearer walks into the cooling mist to be refreshed and cooled without the water being poured onto and drenching the wearer, The present invention cooling and misting system incorporated into clothing is described in terms of a variety of elements, articles, devices, systems, schematics, or functional block components and/or various method or processing steps. Such elements, articles, devices, systems, schematics, or functional blocks, methods or processing steps are created by a multiplicity of various electrical and/or hardware components that perform specified functions and that achieve various results. For example, the cooling and misting system employs various articles of clothing, misting configurations, pumps, pump controls, pump control boxes, pump control switches, pump housings. User harnesses, liquid reservoirs, tubing, misting heads, and other system elements, having a multiplicity of configurations. The present invention incorporates additional hardware components to provide for the system to operate in a functional, efficient, and aesthetically desirable manner. The present invention also incorporates additional hardware components and electrical components to control the system and/or monitor conditions and/or provide feedback. In addition, the present invention cooling and misting system may be practiced within any number of environments and may be customizable for a particular cooling use, including pleasure, work, sport, governmental use and commercial use.

Figure 1:
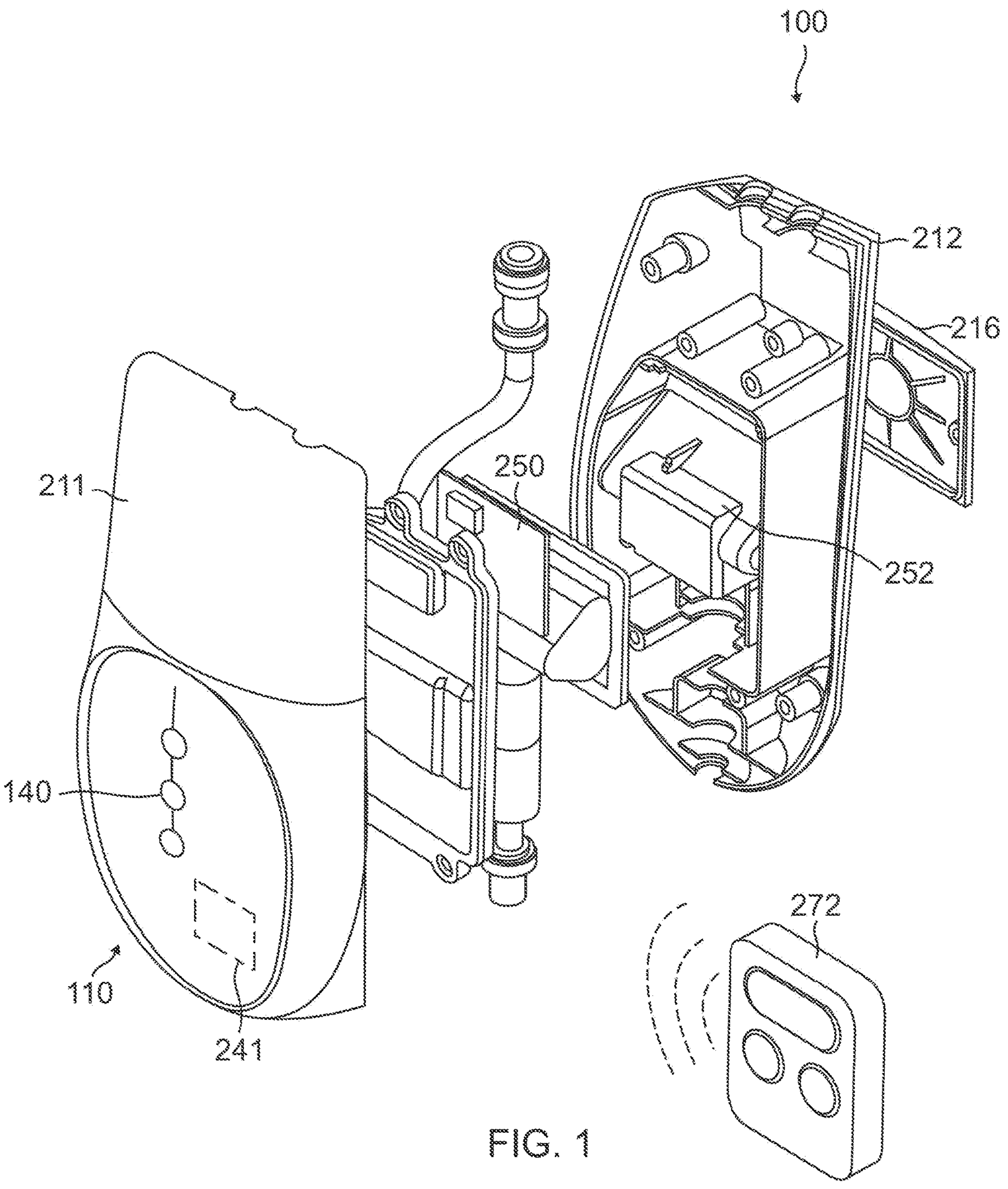
FIG. 1 is an exploded view of the components of the present invention electrically operated pump.
Figure 2:
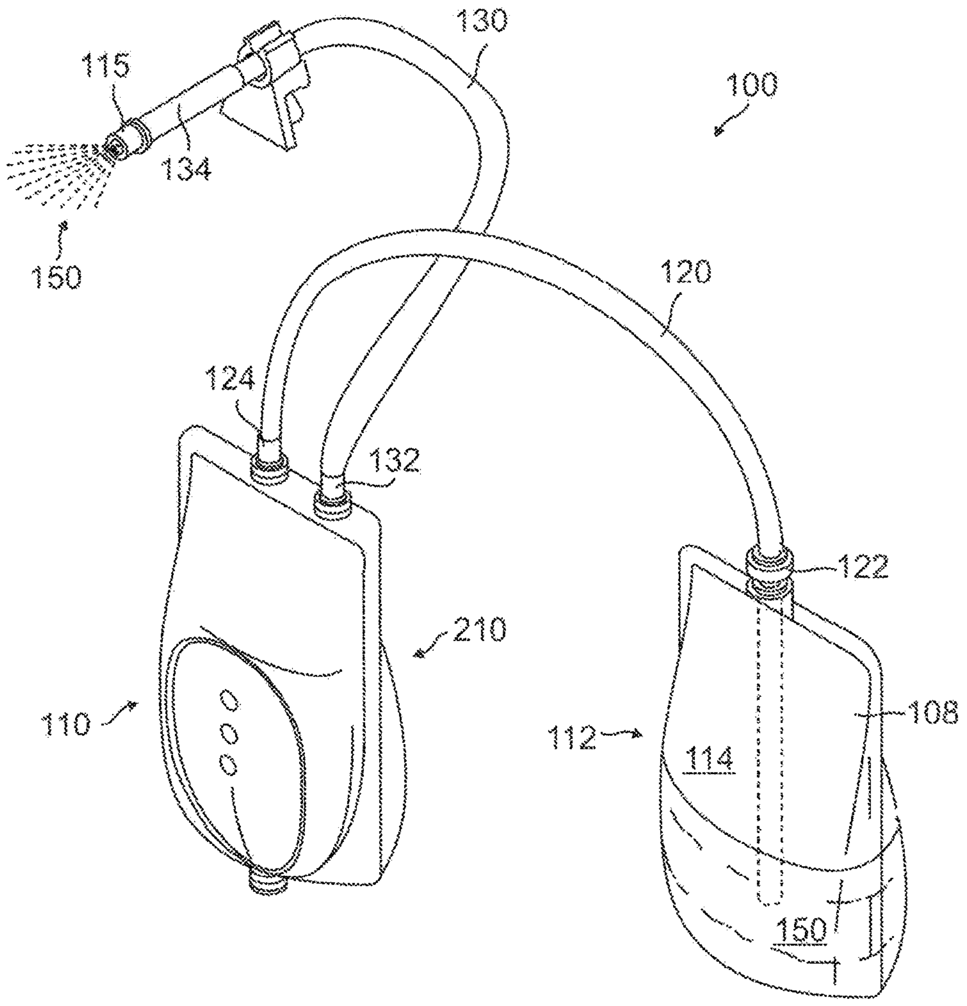
FIG. 2 is a perspective view of the components of the pump illustrated in FIG. 1 in an assembled condition and feed tubing from the fluid reservoir to the pump, and separate distribution tubing from the pump to the spray head.
Figure 3:
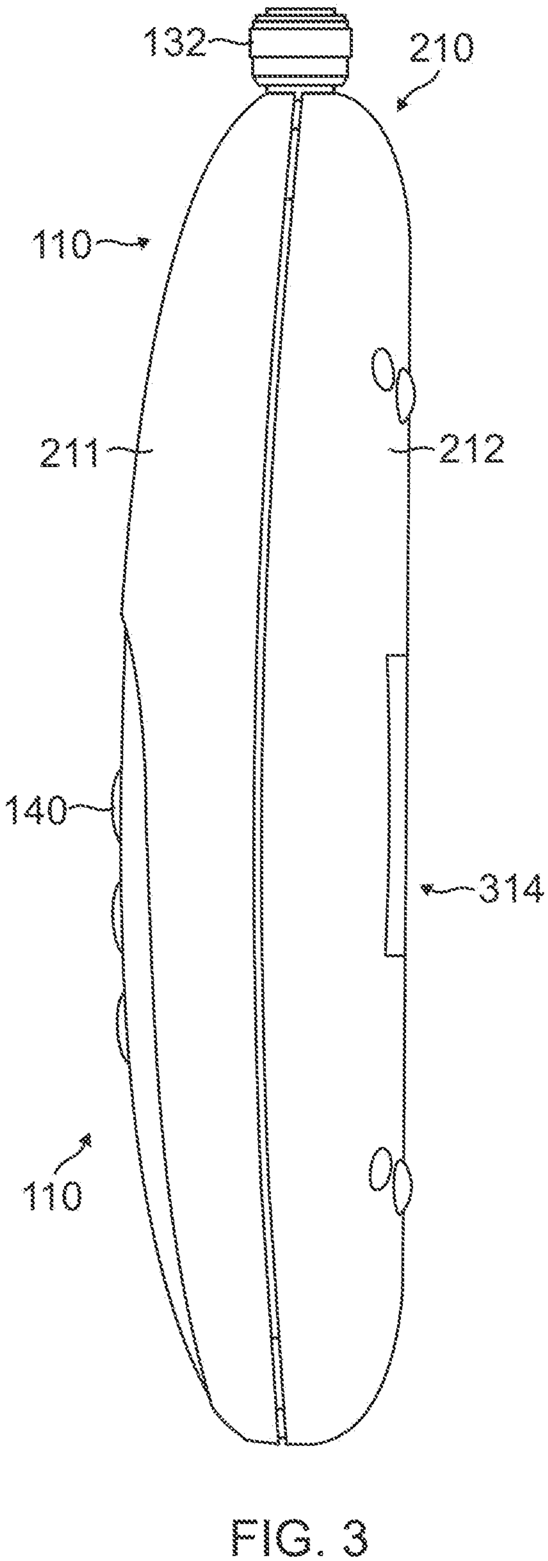
FIG. 3 is a side elevational view of the electrically operated pump.

Referring to FIG. 1, there is illustrated an exploded view of the components of the present invention electrically operated pump. Referring to FIG. 2, there is illustrated a perspective view of the components of the pump illustrated in FIG. 1 in an assembled condition and feed tubing from the fluid reservoir which is primarily a clean water reservoir to the pump, and separate distribution tubing from the pump to the spray head. Referring to FIG. 3, there is illustrated a side elevational view of the electrically operated pump.

Referring to FIGS. 1, 2, 3, and 11, an embodiment of the present invention includes feed tubing 120 comprising a first feed tubing end 122 suitably coupled to and/or extending into fluid reservoir 108 and a second feed tubing end 124 suitably coupled to electrically operated pump 110. Therefore, the feed tubing 120 directs misting fluid from reservoir 108 to electrically operated pump 110. Distribution tubing 130 comprising a first distribution tubing end 132 suitably coupled to electrically operated pump 110 and a second distribution tubing end 134 suitably coupled to a spray nozzle with a misting head 115, wherein distribution tubing 130 directs misting fluid 150 from-electrically operated pump 110 to misting head 115. The fluid within the reservoir is clean water. It is within the spirit and scope of the present invention for the water to be boiled and sterilized and thereafter placed into the fluid reservoir as clean water.

An embodiment of the personal cooling and misting system 100 further comprises pump control 140 to control, via electrically operated pump 110, at least one of a pressure rate, a flow rate, a timing rate, and a misting distribution pattern of misting fluid 150 through misting head 115 which receives the misting fluid 150 through at least one of feed tubing 120 and distribution tubing 130. The present invention further comprises a programmable electronic circuit board 250 to facilitate control of system either directly or via at least one of electrically operated pump 110, pump control 140, or in conjunction with a key fob, such as key fob 272. In an embodiment, key fob 272 wirelessly communicates and manipulates at least one of the electrically operated pump 110, the pump control 140, and the programmable electronic circuit board 250.

Fluid reservoir 108 includes an exterior skin or shell 112 surrounding an interior chamber 114 housing at least one-half quart of misting fluid 150 which preferably is clean water. The outer skin is flexible such as a flexible bag to facilitate being removably retained in an article of clothing such as a high visibility vest, a hiking vest and a shirt. The fluid reservoir exterior skin or shell 112 is made of durable material to withstand repeated use.

The electronically operated pump 110 is designed as a compact two-part exterior unit with a housing 210 including a front half and rear half which are retained together by fastening members, such as screws. The electrically operated pump 110 includes an electronic circuit board 250 connected to a source of power which are retained in housing 210. The source of power is a battery to provide the power to drive the operations of the electronic circuit board 250 and the pump. As illustrated, the housing portion comprises an access panel 216 to facilitate access to the battery 252 for replacement, charging, diagnostics, etc. It is also within the spirit and scope of the present invention for the source of power to be affixed outside the housing 210. In a preferred embodiment, the electrically operated pump is removably retained within the article of clothing so that the battery 252 can be recharged.

Also incorporated into the present invention are pump controls 140 to enable a user to control electronically operated pump 110 and control pump operations selected from the group consisting of misting delivery pressure, misting flow rate and a misting distribution pattern of misting fluid 150 through at least one of the feed tubing 120 and distribution tubing 130. Pump controls 140 are selected from the group consisting of button controls, analog controls, digital controls, touch screen controls, and pump control feedback mechanism such as display screen, indicator lights and audio indicators. The controls are coupled directly to the electronic circuit board 250, alternative pump elements and other system components.

The electronic circuit board 250 includes solid state components to facilitate control of pump controls 140, feed tubing 120, distribution tubing 130 and the misting head 115. In one variation, the electronic circuit board 250 is preprogrammed to provide for a number of functions to control the components of the present invention misting system 100. In an alternative variation, the user is provided with the ability to program the electronic circuit board 250. In one embodiment, the electronic circuit board 250 is bard wired to the system components. In another embodiment, the communication between the electronic circuit board and the system components is wireless.

The misting head 115 atomizes the misting fluid 150. The misting head 115 provides a spray that is selected from the group consisting a single spray, a directionally manipulated spray and a variably actuated spray. For a variably actuated spray, the misting head is alternatively fully closed, fully open or set at a position between closed and open. The spray pattern of the misting head 115 is also configured to provide various misting patterns selected from the group consisting of a conical spray pattern, an elliptical spray pattern, a parabolic spray pattern, and a flat spray pattern. It is also within the spirit and scope of the present invention to have multiple spray heads. Other optional additions include a pressure relief valve and water filters.

Fluid reservoir 108 may comprise a rigid type configuration contoured to accommodate the anatomical feature of the user. Alternatively, it is within the spirit and scope of the present invention for the fluid reservoir to be comprised of a flexible bag type configuration, which allows for deformation to accommodate the movement of a user. Fluid reservoir 108 may comprise materials having requisite durability for repeated use and to withstand shock during use. Fluid reservoir 108 may also comprise proximate sleeves to accept, for example, ice packs to facilitate keeping the misting fluid at a desirably low temperature.

Further referring to FIGS. 1 and 2, the present invention cooling and misting system 100 comprises electrically operated pump 110 to pump misting fluid from fluid reservoir 108 to misting head 115. Electronically operated pump 110 is dimensionally configured for integration within an article of clothing as well as proximately positioned and stored relative to dimensioned and contoured fluid reservoir 108. It is also within the spirit and scope of the present invention for the electrically operated pump 110 and the fluid reservoir 108 to be removably retained within the article of clothing so that the fluid reservoir and the electrically operated pump as well as all of the associated tubing and spray nozzle are removably retained. The electrically operated pump 110 comprises compact housing portions 211 and 212 to house nozzle function as a retrofit kit to be installed in the article of clothing. The electrically operated pump 110 comprises compact housing portions 211 and 212 to house the pumping elements as well as other cooling and misting system 100 components; such as the electronic circuit board 250, portions of feed tubing 120 and distribution tubing 130 that direct misting fluid to and from internal pumping elements, pump controls 140, and other cooling and misting system 100 components. Electronically operated pump 110 further comprises an internal electrical source, such as battery 252 to provide the necessary electrical source to drive the operation of pump, as well as other system 100 components. In an embodiment, battery 252 may be disposable, but preferably comprises a rechargeable battery source, which may be charged directly or in an embodiment, by a solar powered charging mechanism. In an embodiment, housing portion 212 comprises access panel 216 to accommodate access to the battery 252 for replacement, charging and diagnosis. In other embodiments, the battery 252 may be configured to couple to and provide the power source to pump while positioned at an exterior portion of pump housing 210, such as an exterior portion of housing portions 211 or 212. Among such embodiments, any exterior placement of battery 252 may be configured for placement in an aesthetically pleasing manner, such as to maintain the contour, smoothness, continuous surface aspect, and other aesthetic characteristic traits of pump housing 210.

It will be further appreciated that electrically operated pump 110 may further comprise pump controls 140 that provide for a user to control the pump, and in some embodiments pump 110 may comprise a display screen 241. The dimensions of the pump are of a compact nature, such that the pump is roughly of a size to fit in the palm of an average adult and within a compact storage compartment of an article of clothing. To further appreciate the compact nature of pump 110, referring to FIG. 3 there is illustrated a side elevational view of electrically operated pump 110 which demonstrates the narrow configuration of the pump, and moreover, the relatively planar configuration of the underside of electrically operated pump 110 which facilitates pump integration within article of clothing. As illustrated in FIGS. 1, 2 and 3, external housing portions 211 and 212, in a preferred embodiment, comprise aesthetically pleasing configurations, such as exemplary shown having round contours and relatively smooth surface configurations. Moreover, housing portions 211 and 212 may comprise a plurality of materials, but in a preferred embodiment, comprise a lightweight material such as lightweight polycarbonate, PVC, and like materials that are durable and may further withstand shock during use.

Cooling and misting system 100 comprises pump controls 140 to control, via electrically operated pump 110, at least one of a pressure, a flow rate, and a misting distribution pattern of the misting fluid through at least one of feed tubing 120 and distribution tubing 130. Pump controls 140 may comprise various dial type controls, button type controls, analog controls, digital controls, touch screen controls, as well as pump control feedback mechanisms such as display screens, indicator lights, and audio indicators. It will be further appreciated that pump controls 140 may be directly coupled to electronic circuit board 250, internal pump elements, and other system components.

The electronic circuit board 250 may comprise various solid-state components to effectuate operation of the cooling and misting system 100. For example, electronic circuit board 250 may be suitably coupled to pump controls, such as pump controls 240, feed and distribution tubing, such as feed tubing 120 and/or distribution tubing 130, misting heads, system components disclosed herein. The electronic circuit board is preferably shielded from possible interaction and/or contamination by any of misting the fluid flowing in proximity to it. In one embodiment, electronic circuit board may be factory programmed to provide for a discrete number of functions to suitably control and/or operate the personal cooling and misting system 100. Alternatively, the electronic circuit board may be capable of programming by a user either directly or wirelessly. The electronic circuit board may further be configured to compute and manipulate various inputs, such as by external sensors. The electronic circuit board may direct other system components in response to such inputs and/or other computations. The electronic circuit board may operate with other system components in a wireless or direct hard-wired fashion. Additionally, the electronic circuit board may provide for alerts, such as digital, visual, audio, to be directed to an external environment or user.

The present invention cooling and misting system 100 comprises feed tubing 120 comprising a first feed tubing end 122 suitably coupled to and/or extending into fluid reservoir 108 and a second feed tubing end 124 suitably coupled to electrically operated pump 110, wherein feed tubing 120 enables misting fluid to travel from the fluid reservoir 108 to the electrically operated pump 110. Cooling and misting system 100 further comprises distribution tubing 130 comprising a first distribution tubing end 132 suitably coupled to electrically operated pump 110 and a second distribution tubing end 134 suitably coupled to misting head 115, wherein distribution tubing 130 enables misting fluid to travel from the electrically operated pump 110 to the misting head 115. As illustrated in FIG. 2, feed tubing 120 and distribution tubing 130 partially extend into the pump to couple to the internal pumping elements. In a preferred embodiment, distribution tubing 120 and 130 comprise a flexible hose type material, but rigid tubing may be employed as well, or a combination of rigid and flexible tubing. As can be seen throughout the Figures, feed tubing 120 and distribution tubing 130 are configured to respectively couple to pump 110 at respective proximate and distal ends of the pump. Depending on various configurations of pump 110, feed tubing 120 and distribution tubing 130 may couple to pump 110 at any of a number of portions of the pump, such as, both at a distal portion, both at a proximate portion, at a left, front, back, front side portion, of the pump. In other embodiments, various multiple tubing may be incorporated to accommodate more than a single feed and/or distribution tubing.

In an embodiment, the personal cooling misting system 100, may further comprise various mechanical securing mechanisms coupled to preferably misting head 115, but also to other system components. The mechanical securing mechanism facilitates securing misting head 115, system components, or the entirety of system directly to or proximate to an article of clothing or an anatomical portion of the user. For example, system may comprise a mechanical securing mechanism, such as clips, tabs, screws, snaps, and other like mechanisms to secure a misting head, such as misting head 115, to a bill of a hat, a lapel of a shirt collar, a portion of a dress or polo-type shirt, and the like. The mechanical securing mechanism may alternately be comprised of a hook and loop fasteners type wrap, elastic band, and others to secure to or around an anatomical portion of the user, such as neck, and forehead portion.

In an embodiment, the cooling and misting system 100, may further comprise at least one biometric element/sensor attachable to a portion of the user's body to communicate to the electronic circuit board 250 at least one physical measurement of the user, and wherein at least one of electrically operated pump 110, pump controls 140, or other system components operates in response to the physical measurement. For example, the user may have affixed to a portion of their body one or more biometric elements/sensors that measure; a body surface temperature of the user, other temperatures of the user, a heart rate, a breathing rate, a perspiration condition, and other like biometric conditions.

In an embodiment, the cooling and misting system 100, may further comprise an environmental sensor to relay at least a temperature to a programmable circuit board, such as electronic circuit board 250, and/or other system components to facilitate altering system operation in response to changing environmental conditions. For example, the environmental sensor may at random or continuous fashion, detect the temperature of the ambient environment and relay the sensed temperature accordingly to the programmable circuit board or pump controls to alter the pressure, flow rate and/or misting distribution pattern of the system. In this fashion, as the user moves from one environment to another, such as from the sun into the shade or vice versa, the system will detect the change via the environmental sensor and adjust the system's operation accordingly. Moreover, the environmental condition may change throughout the day or the sun may experience intermittent cloud cover, thereby further warranting a change of cooling misting to the user. This further accentuates the passive, automatic features of the system.

The cooling and misting system 100 provides for various misting distribution patterns, for example a simple misting pattern may comprise at least one of a consistent rate. For example, and with reference to FIG. 8, a graphic depiction 480 of misting head fluid distribution as a function of time is shown. Graph line 482 depicts a distribution rate that shows a consistent distribution of misting fluid over time. In a more complex fashion, graph line 484 depicts a distribution rate pattern that is intermittent and varies as a function of time. For example, graph line 484 depicts an increasing rate over time as shown by the portion of the pattern at 486 and a decreasing rate as shown by the portion of the pattern at 488. Moreover, those skilled in the art will understand that the rate may comprise a differentiable rate as shown by portion 488 or non-differentiable rate as shown by portion 486. Among various embodiments, almost any number of distribution rates and/or patterns may be employed, as well as a completely random distribution rates and/or patterns. Such rates and/or patterns are programmable and/or controlled by the electronic circuit board, such as electronic circuit board 250, coupled to a suitable input mechanism for a user to select/program such various misting distribution rates and/or patterns. System may further comprise various pump controls, such as pump controls 240, to provide input to electronic circuit board 250 regarding such rates and/or patterns, or to allow a user to select from a discrete number of rates and/or pattern choices. Other system 100 components may provide for selecting and/or operationally providing for a particular misting distribution rate and/or patterns.

Up to this point, the technical operating components of the present invention misting system have been described in detail. A primary focus of the present invention is to operationally incorporate the technical misting system into an article of clothing.

Figure 4:
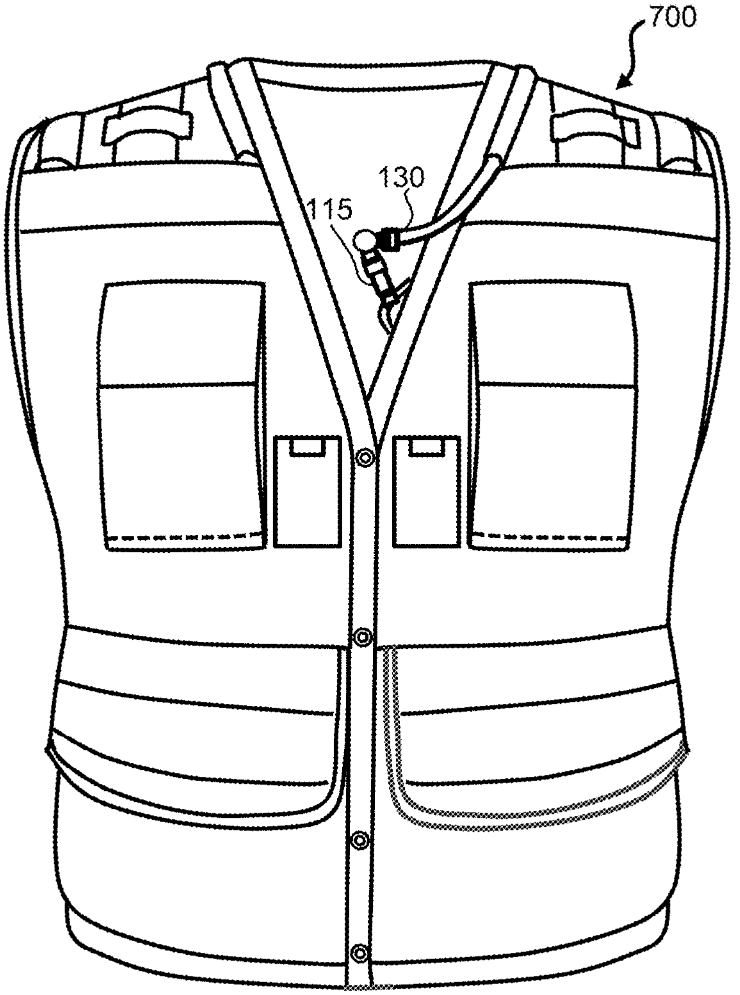
FIG. 4 is a front view of a vest incorporating the present invention within the vest and the spray head attached to a lapel of the vest.
Figure 5:
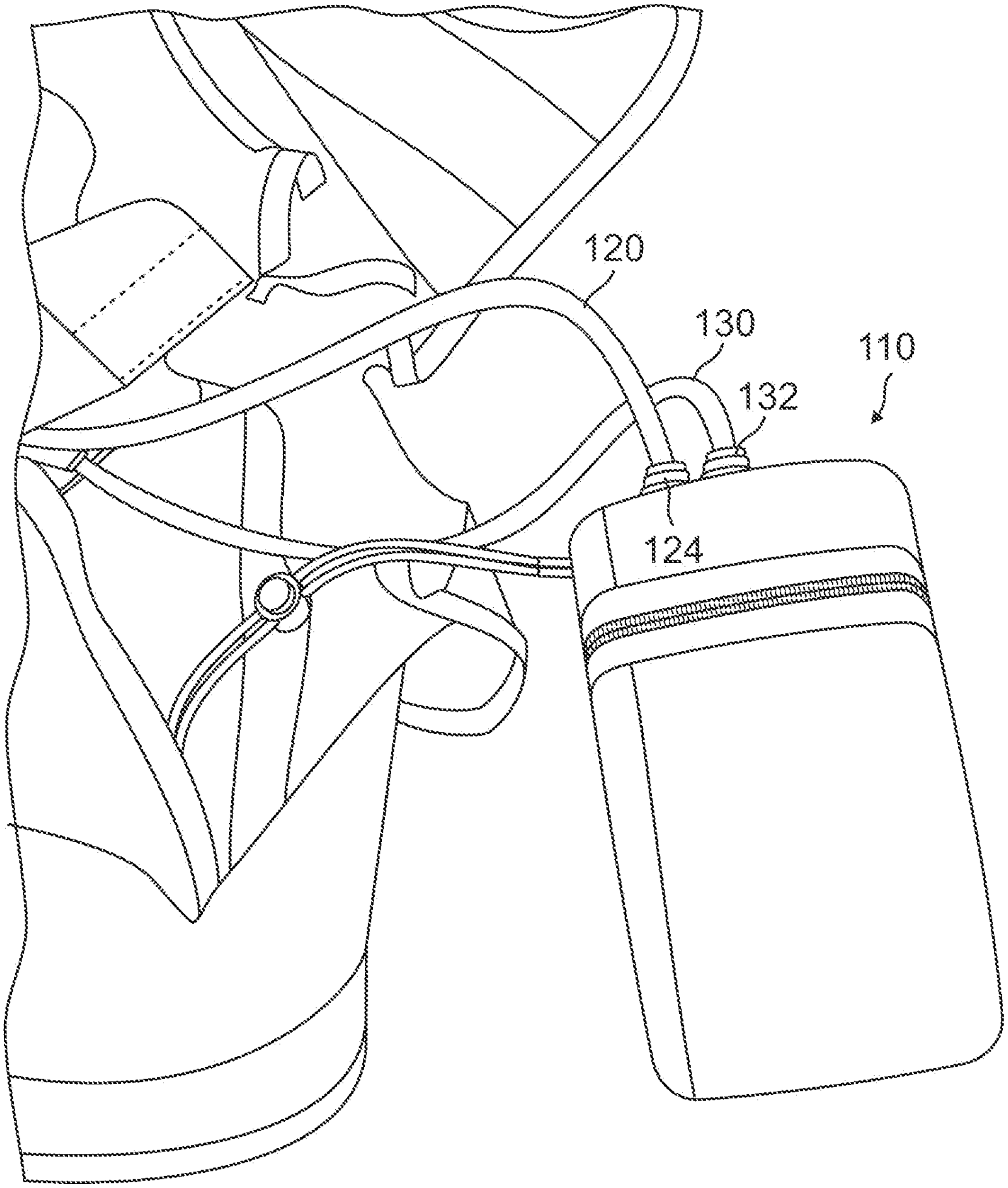
FIG. 5 is a perspective view of the electrically operated pump removed from a garment and illustrating two tubing lines, one tubing line connecting the fluid reservoir to the electrically operated pump and the second tubing line connecting the electrically operated pump to the distribution spray head or nozzle.
Figure 6:
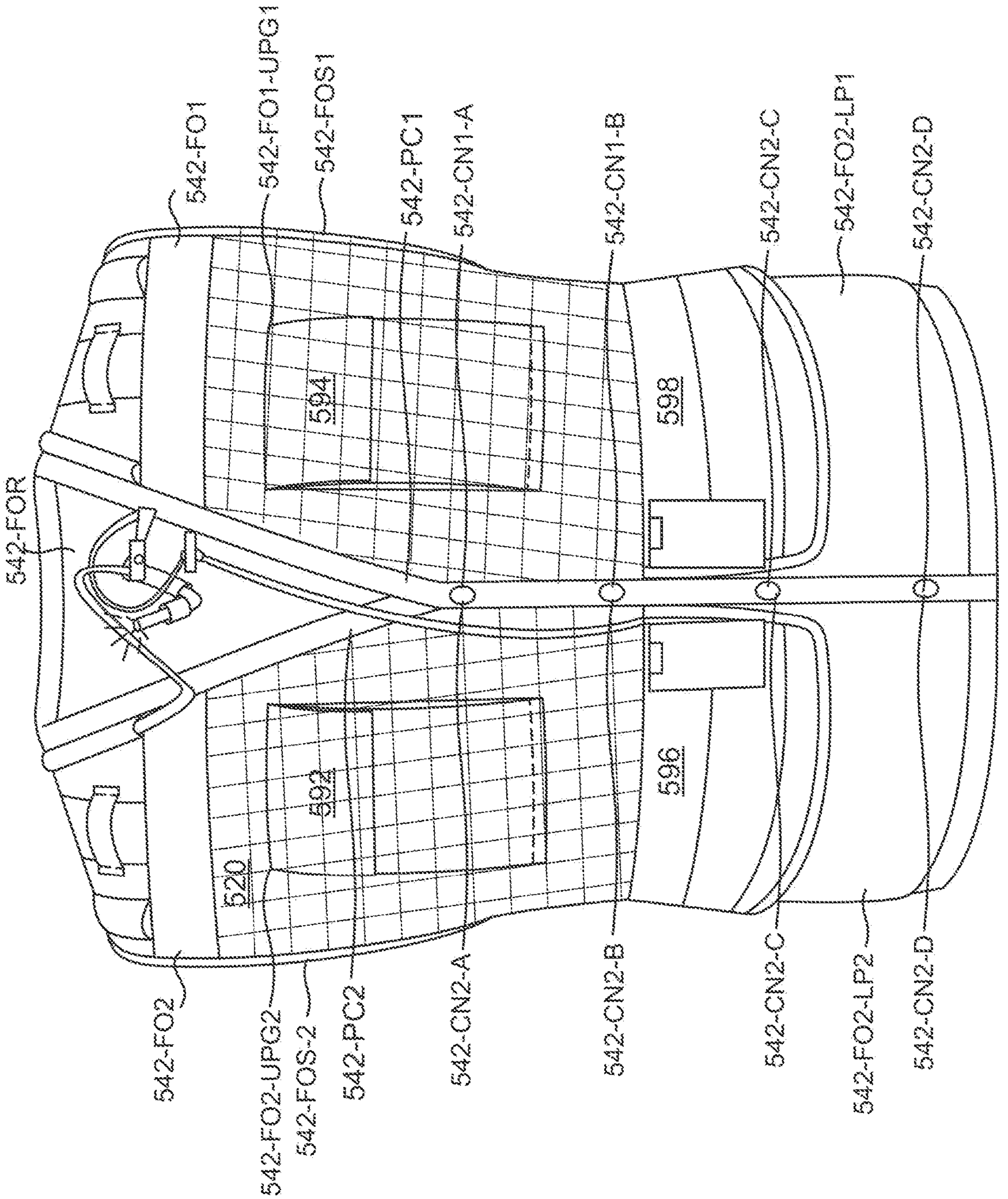
FIG. 6 is a front view of a high visibility vest incorporating the present invention within the safety vest and the spray head attached to a lapel of the safety vest.
Figure 7:
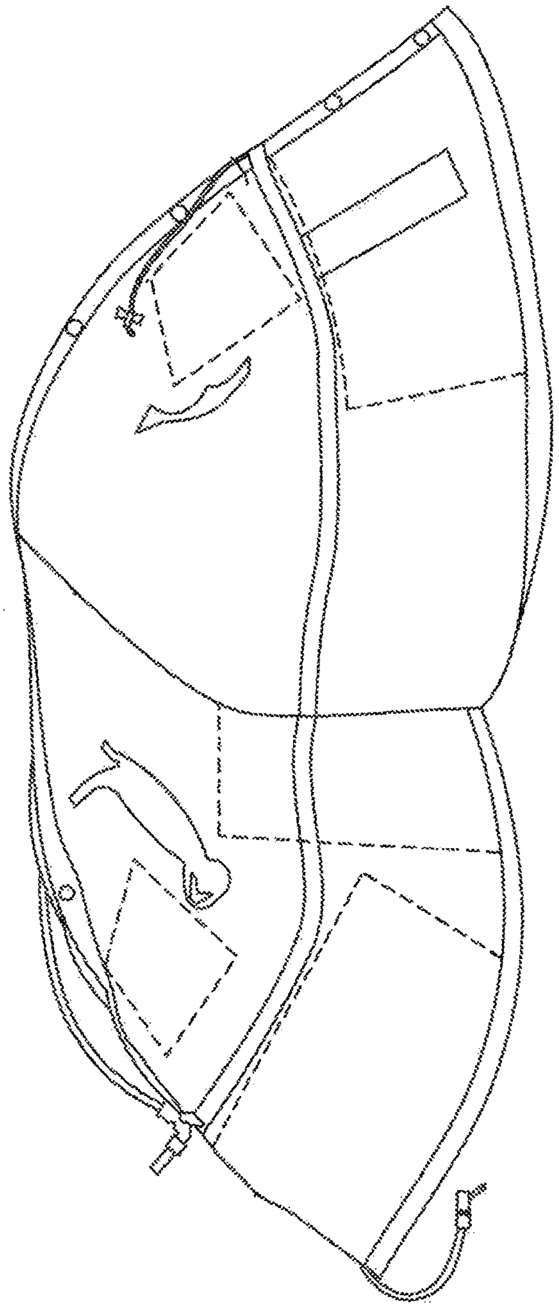
FIG. 7 is an open rear of the interior of the high visibility vest incorporating the present invention within the safety vest.

Referring to FIG. 4, there is illustrated a front view of a vest incorporating the present invention within the vest and the spray head attached to a lapel of the vest. Referring to FIG. 5, there is illustrated a perspective view of the electronically operated pump removed from a garment and illustrating two tubing lines, one tubing line connecting the fluid reservoir to the electrically operated pump and the second tubing line connecting the electrically operated pump to the distribution spray bead or nozzle. Referring to FIG. 6, there is illustrated a front view of a high visibility vest incorporating the present invention within the high visibility vest and the spray head attached to a lapel of the high visibility vest. Referring to FIG. 7, there is illustrated a rear view of the present invention incorporated into an article of clothing which is a high visibility vest, with a cap to close an opening to a fluid reservoir within the high visibility vest.

Referring to FIGS. 4 through 7, the present invention personal cooling and misting system 100 is incorporated into an article of clothing. A primary focus of the present invention is the incorporation of the personal cooling and misting system 100 incorporated into a high visibility vest 700. The high visibility vest 700 includes an outer layer which has reflective material on its entire exterior surface. The reflective material is visible for great distances and glows in the dark at night when light shines on it. The high visibility vest is worn by a person who is engaged in an activity where it is important that the person is visible. This includes workers who work at locations which are near roadways where vehicles are traveling, many times at high speed. The location is frequently outdoors meaning the person is subjected to outside work environments such as the sun and heat. It is important for the person to stay hydrated and be cooling from the heat. Drinking water is important but this involves carrying a container such as a water bottle, either by hand or on a belt.

The present invention provides an apparatus to enable a person to be cooled with misting fluid to refresh the person and overcome heat exhaustion. A key feature of the present invention is to incorporate the cooling and misting system into the high visibility vest wherein a reservoir of water is ergonomically retained in the high visibility vest 700 and fluidly connected to a retained electronic pump which is then fluidly connected to a misting head 115. The misting head 115 projects a timed mist of water into the air at an elevation in line with a person's head and face so that the person walks into the water mist and is cooled. The quantity and timing of the water mist is calculated to refresh the person but not drench that person or the person's clothing with water.

The article of clothing into which the present invention is incorporated is selected from the group consisting of vests (also called high visibility vests), shirts, jackets, pants, vests, and other types of clothing articles further described herein. Therefore, the components will now be described to show how they are incorporated into a high visibility vest 700. The high visibility vest 700 includes an outer fabric wall. When referred to as a glow material, it means that the material will glow in the dark when light hits it.

The entire outer longitudinal second half has a solid fabric lower portion and a mesh with glow material upper portion. The entire outer first side, the entire rear outer wall to the entire outer second side is made of mesh glow material. The high visibility vest exterior including an entire outer longitudinal first half extends for an entire outer first side an entire rear outer wall to an entire outer second side to the entire outer longitudinal second half. The entire outer longitudinal first half has a solid fabric lower portion and a mesh with glow material upper portion.

Figure 8:
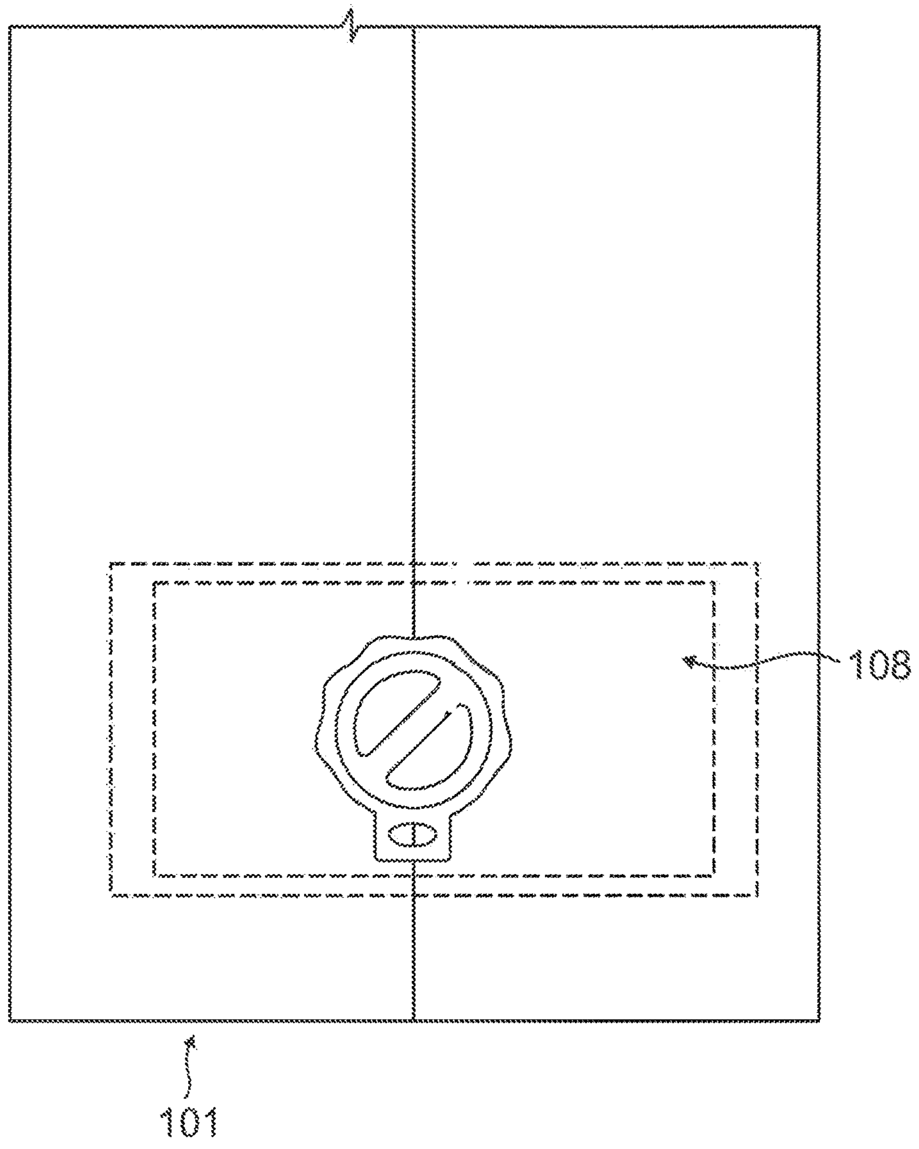
FIG. 8 is a rear view of the present invention incorporated into an article of clothing which is a high visibility vest, with a cap to close an opening to a fluid reservoir within the safety vest.

Various representative embodiments of a personal cooling misting system may be applied to any of various pump style cooling misting system that may be configured and/or adapted for a user. Referring now to FIG. 8, an embodiment of a personal cooling misting system 100 comprises a fluid reservoir 105 dimensioned and contoured to facilitate for a user to wear and carry fluid reservoir 105, wherein fluid reservoir 105 accommodates a volume of a misting fluid 150. Misting system 100 further comprises an electrically operated pump 110 to pump misting fluid 150 from fluid reservoir 105 to a misting head 115, and the pump is dimensionally configured for proximate positioning and storage to dimensioned and contoured fluid reservoir 105.

In an embodiment, misting system 100 comprises feed tubing 120 comprising a first feed tubing end 122 suitably coupled to and/or extending into fluid reservoir 105 and a second feed tubing end 124 suitably coupled to electrically operated pump 110, wherein feed tubing 120 directs misting fluid 150 from reservoir 105 to electrically operated pump 110. In a continuing embodiment, misting system 100 further comprises distributive tubing 130 comprising a first distributive tubing end 132 suitably coupled to electrically operated pump 110 and a second distributive tubing end 134 suitably coupled to misting head 115, wherein distributive tubing 130 directs misting fluid 150 from electrically operated pump 110 to misting head 115.

Continuing with an embodiment of the personal cooling misting system, misting system 100 further comprises pump control 140 to control, via electrically operated pump 110, at least one of a pressure, a flow rate, and a misting distribution pattern of misting fluid 150 through at least one of feed tubing 120 and distributive tubing 130. With temporary reference to FIG. 9, misting system 100 may further comprise a programmable electronic circuit board 250 to facilitate misting system 100 control either directly or via at least one of electrically operated pump 110, pump control 140, other misting system 100 components, or perhaps in conjunction with a key fob, such as key fob 272. In an embodiment, key fob 272 wirelessly communicates and manipulates at least one of electrically operated pump 110, pump control 140, programmable electronic circuit board 250, and/or other misting system 100 components.

Returning now to FIG. 8, fluid reservoir 105 comprises dimensions such that it may be, in a preferred embodiment, received by at least one storage compartment of a backpack (not shown), wherein the backpack facilitates wearing fluid reservoir 105 by the user. As mentioned, fluid reservoir 105 comprises a volume to receive misting fluid 150. Fluid reservoir 105 comprises a suitable orifice, known to those in the art, which allows for filling/emptying fluid reservoir 105. Fluid reservoir 105 may comprise a rigid type configuration, a flexible bag type configuration, or any combination thereof. Regardless of configuration, fluid reservoir 105 may comprise materials having requisite durability for repeated use and to withstand shock during use. Fluid reservoir 105 may also comprise proximate sleeves to accept, for example, ice packs to facilitate keeping misting fluid 150 at a desirably low temperature. Fluid reservoir 105 may alternately comprise of a water bottle type configuration, such that a user may easily detach it from other misting system 100 components to use as a separate water bottle; or misting system 100 may be operationally configured to benefit from a separate water bottle. Although not the main purpose of the present disclosure, those skilled in the art will further understand that fluid reservoir 105 may comprise any type of vessel that can contain a fluid, such as a large water jug, cooler, vat, tub, and the like that may or may not be easily carried by a user.

In an embodiment, those skilled in the art will understand and appreciate that misting system 100 may further comprise a drink line, such as drink line 160, that may tap into at least one of feed tubing 120 and/or distributive tubing 130; but preferably into feed tubing 120 as depicted by FIG. 8. In this manner, the user may not only benefit by the topical cooling provided by misting system 100, but may further benefit by having the ability to ingest fluid to remain internally hydrated; assuming of course that misting fluid 150 comprises a potable fluid suitably for the user. Misting fluid 108 could, in one embodiment, even comprise various electrolytes to provide additional hydration benefits to the user. Those skilled in the art will further understand that an operable valve, such as a Y-type valve/connector may be employed to couple drink line 160 to any of the various disclosed tubing or other misting system 100 components.

In an embodiment and with continued reference to misting system 100, misting system 100 comprises electrically operated pump 110 to pump misting fluid 150 from fluid reservoir 105 to misting head 115, and the pump is dimensionally configured for proximate positioning and storage to dimensioned and contoured fluid reservoir 105. In an embodiment, electrically operated pump 110 may preferably comprise at least one of a piston pump and diaphragm pump, although other pump types now known or developed in the future may be employed. As mentioned, the pump is dimensionally configured for positioning and storage to fluid reservoir 105. For example, and with reference to FIG. 2, electrically operated pump 110 comprises compact housing portions 211 and 212 to house the pumping elements as well as other misting system 100 components; such as the electronic circuit board 250 discussed in greater detail below, portions of feed and tubing 120 and distribution tubing 130 that direct misting fluid 150 to and from internal pumping elements, pump controls 140, and perhaps other misting system 100 components. Electrically operated pump 110 further comprises an internal electrical source, such as battery 252 to provide the necessary electrical source to drive the operation of pump 110, as well as other system 100 components. In an embodiment, battery 252 may be disposable, but preferably comprises a rechargeable battery source, which may be charged directly or in an embodiment, by a solar powered charging mechanism. In an embodiment, housing portion 212 comprises access panel 216 to accommodate access to battery 252 for replacement, charging, diagnosis, etc. In other embodiments, though, battery 252 may be configured to couple to and provide the power source to pump 110 while positioned at an exterior portion of pump housing, such as an exterior portion of housing portions 211 or 212; and among such embodiments, any exterior placement of battery 252 may be configured for placement in an aesthetically pleasing manner, such as to maintain the contour, smoothness, continuous surface aspect, and other aesthetic characteristic traits of system 100's housing.

Figure 9:
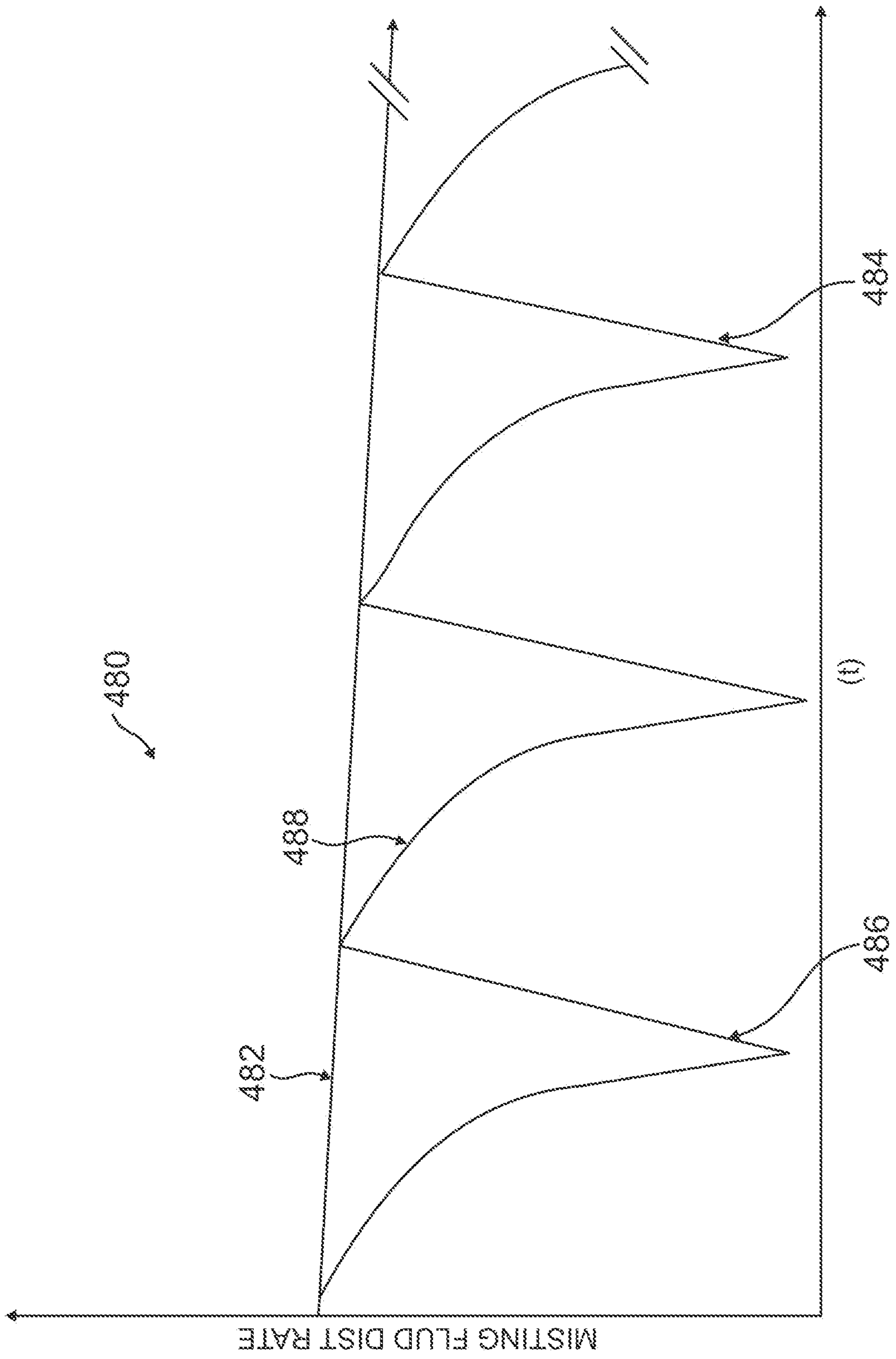
FIG. 9 is a graphic representation of various personal cooling misting system distribution rates as a function of time.
Figure 10:
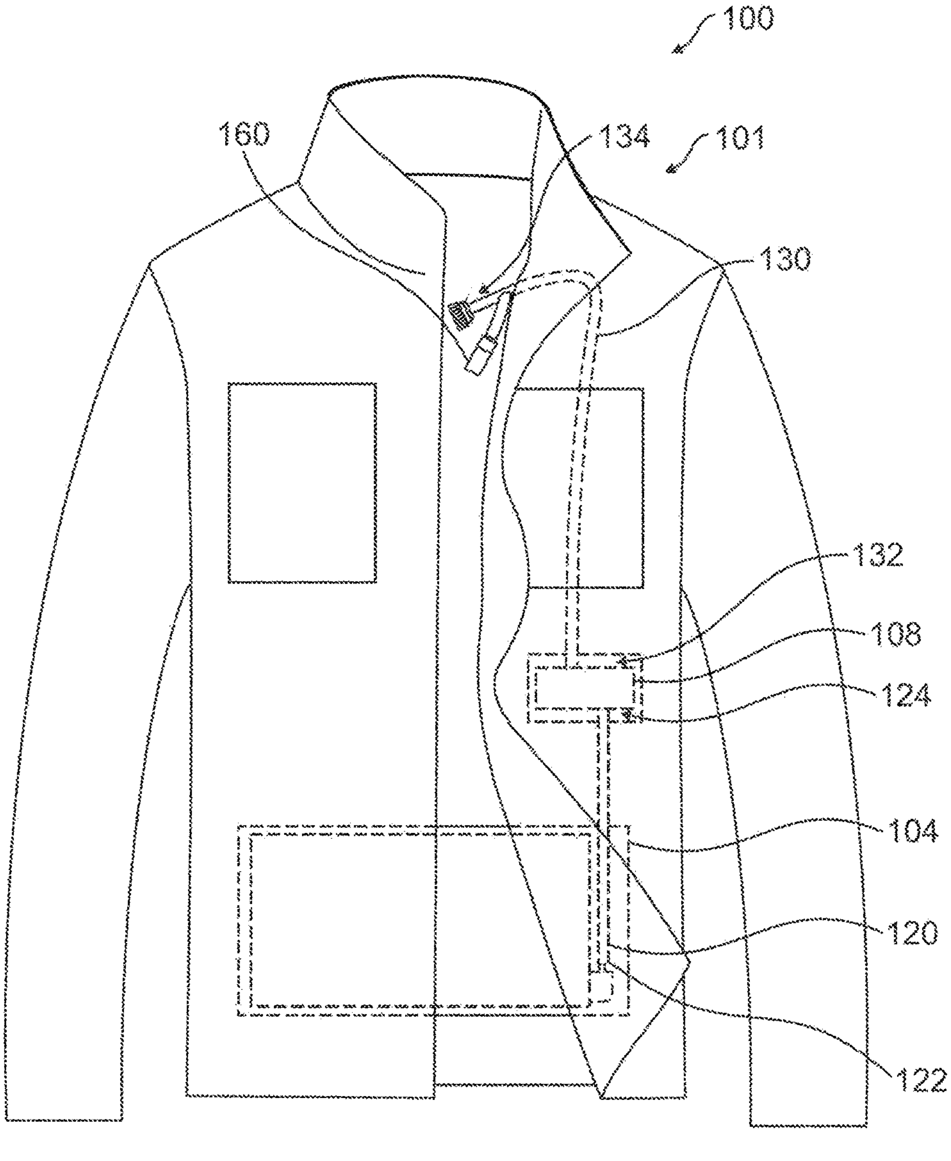
FIG. 10 is a front perspective view of another article of clothing incorporating the present invention therein.

It will be further appreciated by those skilled in the art that pump 110 may further comprises pump controls 140 that provide for a user to control pump 110, and in some embodiments pump 110 may comprise a display screen, such as shown by display screen 241. To continue with the compact nature of pump 110, it will be appreciated by those skilled in the art that the dimensions of pump 110 are of a compact nature, such that pump 110 is roughly of size to fit in the palm of an average adult. To further appreciate the compact nature of pump 110 and with reference to FIG. 3, a side view of pump 110 demonstrates the narrow configuration of pump 110, and moreover, the relatively planar configuration of the underside 314 of pump 110, which facilitates pump 110 for placement proximate to fluid reservoir 105 and/or-for storage within a backpack or other type of personal toting article. As can be seen by FIGS.-8-10, the external housing portions 211 and 212, in a preferred embodiment, comprise aesthetically pleasing configurations, such as exemplary shown having round contours and relatively smooth surface configurations. Moreover, housing portions 211 and 212 may comprise of a plurality of materials, but in a preferred embodiment comprise of a lightweight material such as lightweight polycarbonate, PVC, and like materials that are durable and may further withstand shock during use.

In an embodiment and disclosed briefly above, misting system 100 comprises pump controls 140 to control, via electrically operated pump 110, at least one of a pressure, a flow rate, and a misting distribution pattern of misting fluid 150 through at least one of feed tubing 120 and distributive tubing 130. Pump controls 140 may comprise various dial type controls, button type controls, analog controls, digital controls, touch screen controls, as well as pump control feedback mechanisms such as display screens, indicator lights, audio indicators, and others now known or developed in the future. It will be further appreciated by those skilled in the art that pump controls 140 may be directly coupled to electronic circuit board 250, internal pump elements, and other misting system 100 components.

In an embodiment, misting system 100 comprises an electronic circuit board, such as electronic circuit board 250. Electronic circuit board may comprise various solid-state components to effectuate operation of misting system 100 in various manners disclosed here or elsewhere in this disclosure. For example, electronic circuit board 250 may be suitably coupled to pump controls, such as pump controls 140, feed and distribution tubing, such as feed tubing 120 and/or distribution tubing 130, misting heads, such as misting head 115, fluid reservoirs, such as fluid reservoir 105, and variety of other misting system 100 components disclosed herein or developed in the future.

The electronic circuit board is preferably shielded from possible interaction and/or contamination by any of the misting fluid flowing in proximity to it. In one embodiment, electronic circuit board may be factory programmed to provide for a discrete number of functions to suitably control and/or operate the personal cooling misting system disclosed, or it may be capable of programming by a user either directly or perhaps wirelessly. The electronic circuit board may further be configured to compute and manipulate various inputs, such as by external sensors; and the electronic circuit board may direct other misting system 100 components in response to such inputs and/or other computations. The electronic circuit board may operate with other misting system 100 components in a wireless or direct hard-wired fashion. Additionally, the electronic circuit board may provide for alerts, be they digital, visual, audio, to be directed to an external environment or user.

In an embodiment and to discuss in greater detail, misting system 100 comprises misting head 115, wherein misting head 115 atomizes misting fluid 150 directed to it, and may comprise misting heads generally known to those skilled in the art. In an embodiment, misting head 115 can be at least one of, directionally manipulated and variably actuated for use. Variably actuated for use should be understood to mean that misting head 115 may be fully closed, fully open, or set at some discrete or variable position between the fully open and closed position. Moreover, misting head 115 may be configured to provide various misting configurations, such as a conical spray configuration, an elliptical or parabolic spray configuration, a flat spray configuration, etc. In an embodiment, misting system 100 may comprise for more than a single misting head, but rather multiple misting heads may be employed such that a user may share their personal cooling misting system with a secondary user proximate to them. And misting system 100 may be configured to accommodate such multiple misting heads, for example, by exploiting multiple distributive tubing coupled to the electrically operated pump.

Among embodiments disclosed, those skilled in the art will appreciate that misting system 100 may incorporate various ancillary components desirable by various users, as well as to promote safe, efficient, reliable use of misting system 100. For example, one ancillary component may comprise a misting fluid filter that may be incorporated into misting system 100. Another ancillary component, may comprise a pressure relief valve, such that should system 100 encounter an operational condition wherein pump 110 creates an excessive pumping condition without adequate bleed off by any of the other misting system 100 components, any such elevated pressure condition will be mitigated by relieving pressure through such pressure relief valve. The above are merely two exemplary ancillary components that may be incorporated into misting system 100, by other ancillary components that may be incorporated into system 100 to further enhance the benefits of misting system 100 for the user, are contemplated by this disclosure. It should also be understood that a drink tube can be attached to any of the embodiments herein.

In an embodiment and as mentioned above, misting system 100 comprises feed tubing 120 comprising a first feed tubing end 122 suitably coupled to and/or extending into fluid reservoir 105 and a second feed tubing end 124 suitably coupled to electrically operated pump 110, wherein feed tubing 120 directs misting fluid 150 from reservoir 105 to electrically operated pump 110. Misting system 100 further comprises distributive tubing 130 comprising a first distributive tubing end 132 suitably coupled to electrically operated pump 110 and a second distributive tubing end 134 suitably coupled to misting head 115, wherein distributive tubing 130 directs misting fluid 150 from electrically operated pump 110 to misting head 115. As can be seen with reference to FIG. 2, feed tubing 120 and distributive tubing 130 partially extend into pump 110 to couple to the internal pumping elements. In a preferred embodiment, feed tubing 120 and distribution tubing 130 comprise a flexible hose type material, but rigid tubing may be employed as well, or a combination of rigid and flexible tubing. Moreover, as can be seen throughout the FIGS. feed tubing 120 and distribution tubing 130 are configured to respectively couple to pump 110 at respective proximate and distal ends of pump 110, however misting system 100 is not limited in this regard. Depending on various configurations of pump 110, distribution tubing 120 and 130 may couple to pump 110 at any of a number of portions of pump 110, such as, both at a distal portion, both at a proximate portion, at a left, front, back, front side portion, of pump 110. In other embodiments, various multiple tubing may be incorporated to accommodate more than a single feed and/or distributive tubing.

In an embodiment, the personal cooling misting system, such as misting system 100, may further comprise various mechanical securing mechanisms coupled to preferably misting head 115, but also to other misting system 100 components or the entirety of system 100. The mechanical securing mechanism facilitates securing misting head 115, misting system 100 components, or the entirety of misting system 100 directly to or proximate to a clothing article or an anatomy portion of the user. For example, misting system 100 may comprise a mechanical securing mechanism, such as clips, tabs, screws, snaps, and other like mechanisms to secure a misting head, such as misting head 115, to a bill of a hat, a lapel of a shirt collar, a placket portion of a dress or polo type shirt, and the like. The mechanical securing mechanism may alternately comprise of hook and loop fasteners, elastic band, and others to secure to or around an anatomical portion of the user, such as an arm, neck, forehead portion, etc. In an alternate embodiment, mechanical securing mechanisms may be specifically configured and employed to secure an exemplary system to an animal, such as a pet dog, a horse, various livestock, or perhaps a young child forever, the system may comprise mechanical securing mechanisms to secure the system to other hardware, mechanical systems, and/or architecture. For example, securing mechanisms may be employed to secure misting system 100 to an umbrella to create a portable cooling type station, a restaurant patio table, a bicycle, stadium seating, and limitless other examples to facilitate cooling a proximate user.

In an embodiment, a personal cooling misting system, such as misting system 100, may further comprise at least one biometric element/sensor attachable to the anatomy portion of the user to communicate to preferably electronic circuit board 250, but other misting system 100 components as well, at least one physical measurement of the user, and wherein at least one of electrically operated pump 110, pump controls 140, or other misting system 100 components operates in response to the physical measurement. For example, the user may have affixed to a portion of their anatomy one or more biometric elements/sensors that measure; a body surface temperature of the user, other temperatures of the user, a heart rate, a breathing rate, a perspiration condition, and other like biometric conditions.

In an embodiment, a personal cooling misting system, such as misting system 100, may further comprise an environmental sensor to relay at least a temperature to a programmable circuit board, such as electronic circuit board 250, and/or other system 100 components to facilitate altering system operation in response to changing environmental conditions. For example, the environmental sensor may at random or continuous fashion, detect the temperature of the ambient environment and relay the sensed temperature accordingly to the programmable circuit board or pump controls to alter the pressure, flow rate and/or misting distribution pattern of the system. In this fashion as the user moves from one environment to another, such as from the sun into the shade or vice versa, the system will detect the change via the environmental sensor and adjust the system's operation accordingly. Moreover, the environmental condition may change throughout the day or the sun may experience intermittent cloud cover, thereby further warranting a change of cooling misting to the user. This further accentuates the passive, automatic features of the system.

Those skilled in the art will understand that while elements/sensors may be incorporated into the disclosed system to measure and communicate various external conditions such as environment and biometric as described above, the system is not limited in this regard, and any other elements/sensors that the system may benefit from to maintain a cooling condition by the user, may be employed. For example, a sensor that detects the user transitioning from an outdoor to indoor condition, an area sensor to detect other persons in close proximity, reservoir sensors to alert of conditions, such as elevated temperature of the reservoir misting fluid and/or fluid levels, as well as other sensors well known to those in the art, but not expressly disclosed herein may be employed. Moreover, various elements/sensors may communicate their measurements in a wireless fashion, or the elements/sensors may be hard-wired and coupled directly to the system.

Continuing with an embodiment of system misting 100, system misting 100 provides for various misting distribution patterns, for example a simple misting pattern may comprise at least one of a consistent rate. For example, and with reference to FIG. 11, a graphic depiction 480 of misting head fluid distribution as a function of time is shown. Graph line 482 depicts a distribution rate that shows a consistent distribution of misting fluid over time. In a more complex fashion, graph line 484 depicts a distribution rate pattern that is intermittent and varies as a function of time. For example, graph line 484 depicts an increasing rate over time as shown by the portion of the pattern at 486 and a decreasing rate as shown by the portion of the pattern at 488.

Moreover, those skilled in the art will understand that the rate may comprise a differentiable rate as shown by portion 488 or non-differentiable rate as shown by portion 486. Among various embodiments, almost any number of distribution rates and/or patterns may be employed, as well as a completely random distribution rates and/or patterns. In any event, those skilled in the art will understand that such rates and/or patterns may be programmable and/or controlled by the electronic circuit board, such as electronic circuit board 250, coupled to a suitable input mechanism for a user to select/program such various misting distribution rates and/or patterns. Misting system 100 may further comprise various pump controls, such as pump controls 140, to provide input to electronic circuit board 250 regarding such rates and/or patterns, or to allow a user to select from a discrete number of rates and/or pattern choices. Other misting system 100 components may provide for selecting and/or operationally providing for a particular misting distribution rate and/or patterns.

Figure 11:
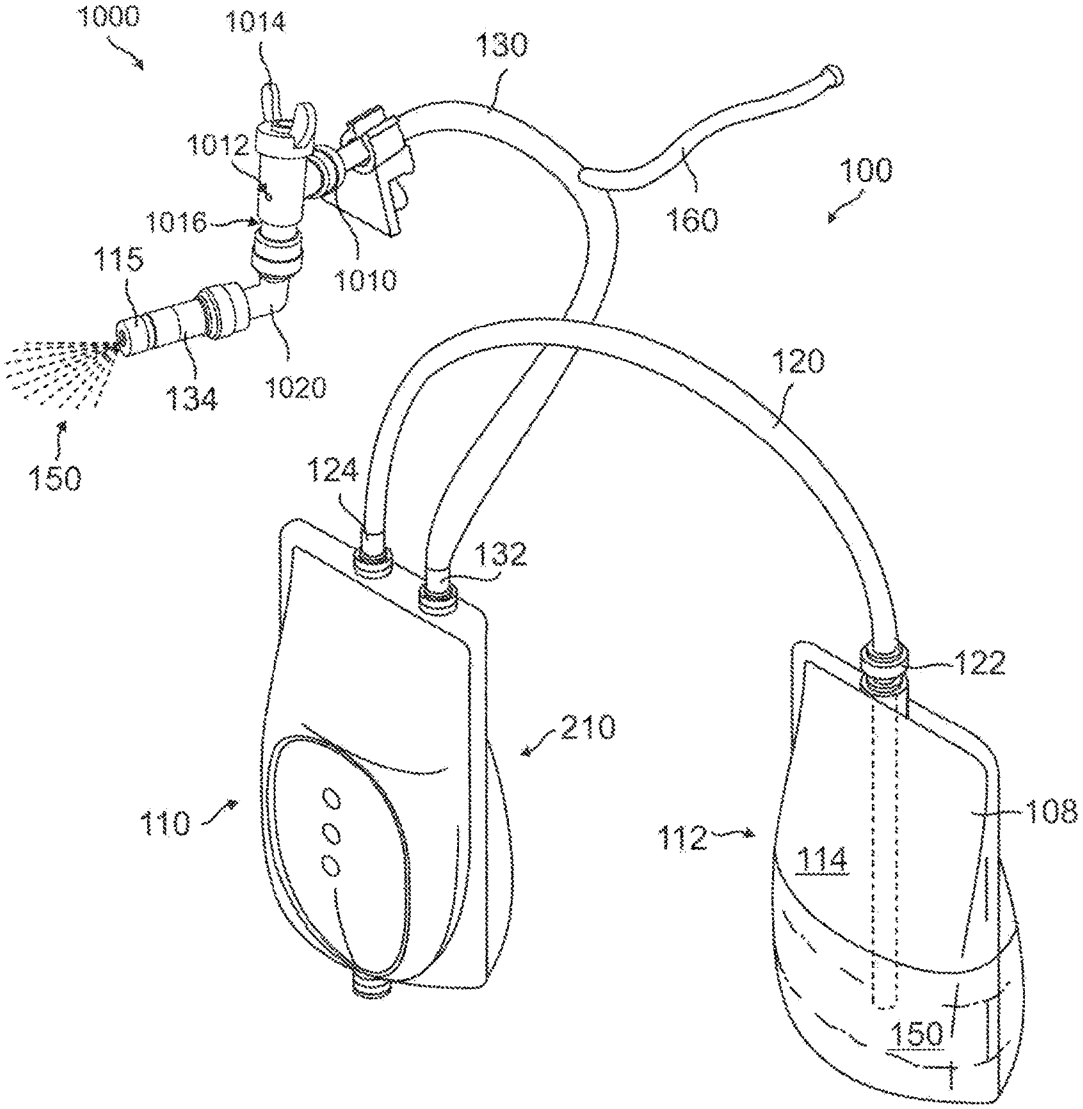
FIG. 11 is a perspective view of the improved personal cooling misting system illustrating the components of the pump in an assembled condition and feed tubing from the fluid reservoir to the pump, and separate distribution tubing from the pump to the spray head.

Referring to FIGS. 11, the improved personal cooling misting system contains a uniquely designed dual 360-degree rotating articulating nozzle 1000 with a purge valve integrally formed to the 360-degree rotating articulating nozzle. Said articulating rotating nozzle has a first section 1010 that rotates 360 degrees in a first plane perpendicular to second distributive tubing end 134 and a second section 1020 that rotates 360 degrees in a second plane 90 degrees, perpendicular, to said first plane. First section 1010 and second section 1020 can both rotate in the clockwise and counter clockwise directions. First section 1010 contains an integrally formed purge valve 1012 with rotating valve knob 1014 to allow opening 1016 to open and close when valve knob 1014 is rotated. Purge valve 1012 allows a user to expel the air contained within the system out opening 1016 until a steady stream of water is flowing. Then, the user can activate the mist system with all air removed. The purge valve opening is always less than 0.5 inches in diameter and typically less than 0.1 inches in diameter. Articulating nozzle Second Section 1020 also has a first end 1022 containing a misting head or misting nozzle 115 for misting.

Further and Referring to FIG. 11, those skilled in the art will understand and appreciate that misting system 100 may further comprise a drink line, such as drink line 160, that may tap into at least one of feed tubing 120 and/or distributive tubing 130; but preferably into feed tubing 120 as depicted by FIG. 11. In this manner, the user may not only benefit by the topical cooling provided by misting system 100, but may further benefit by having the ability to ingest fluid 150 to remain internally hydrated; assuming of course that misting fluid 150 comprises a potable fluid suitably for the user. Misting fluid 150 could, in one embodiment, even comprise various electrolytes to provide additional hydration benefits to the user. Those skilled in the art will further understand that an operable valve, such as a Y-type valve/connector may be employed to couple drink line 160 to any of the various disclosed tubing or other misting system 100 components.

Figure 12:
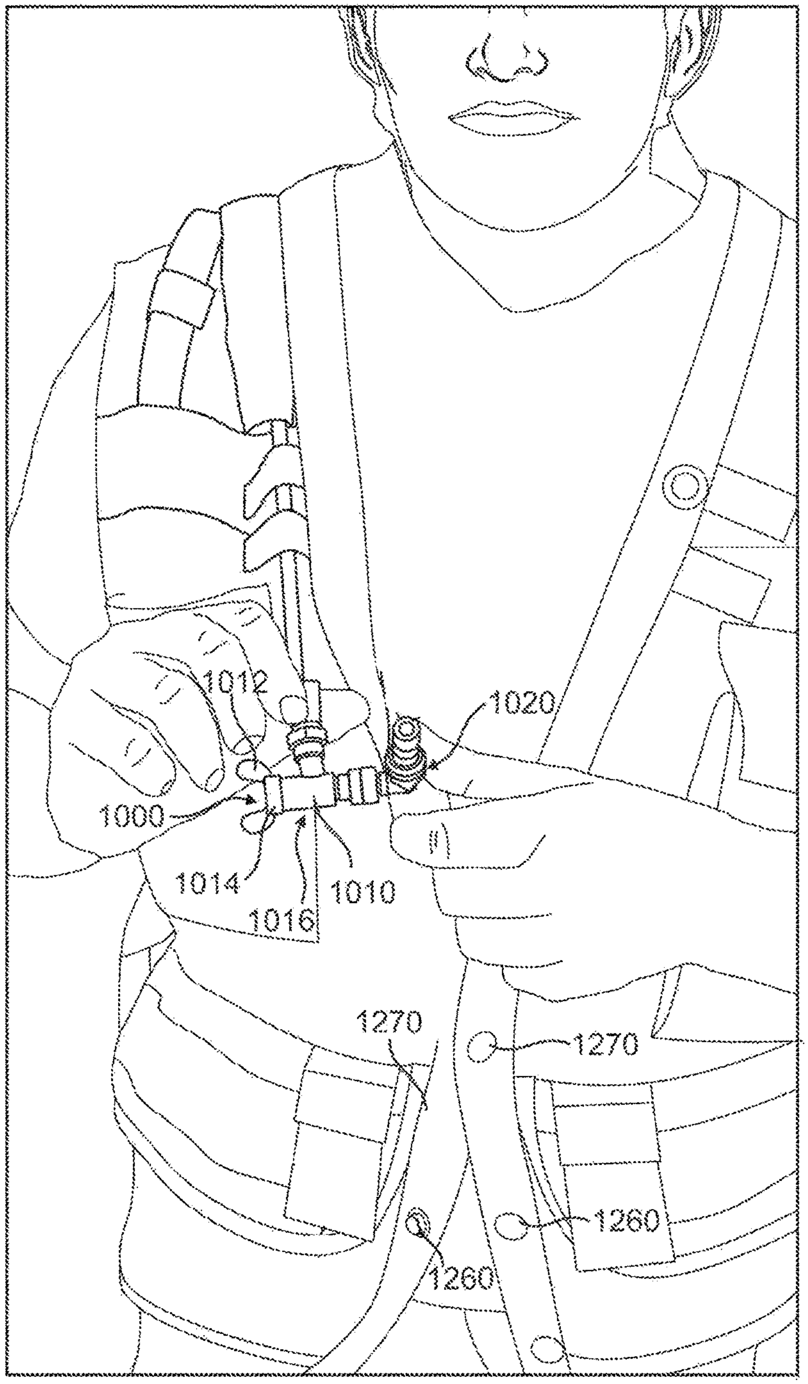
FIG. 12 is a front perspective view of the improved personal cooling misting system with high visibility vest.
Figure 13:
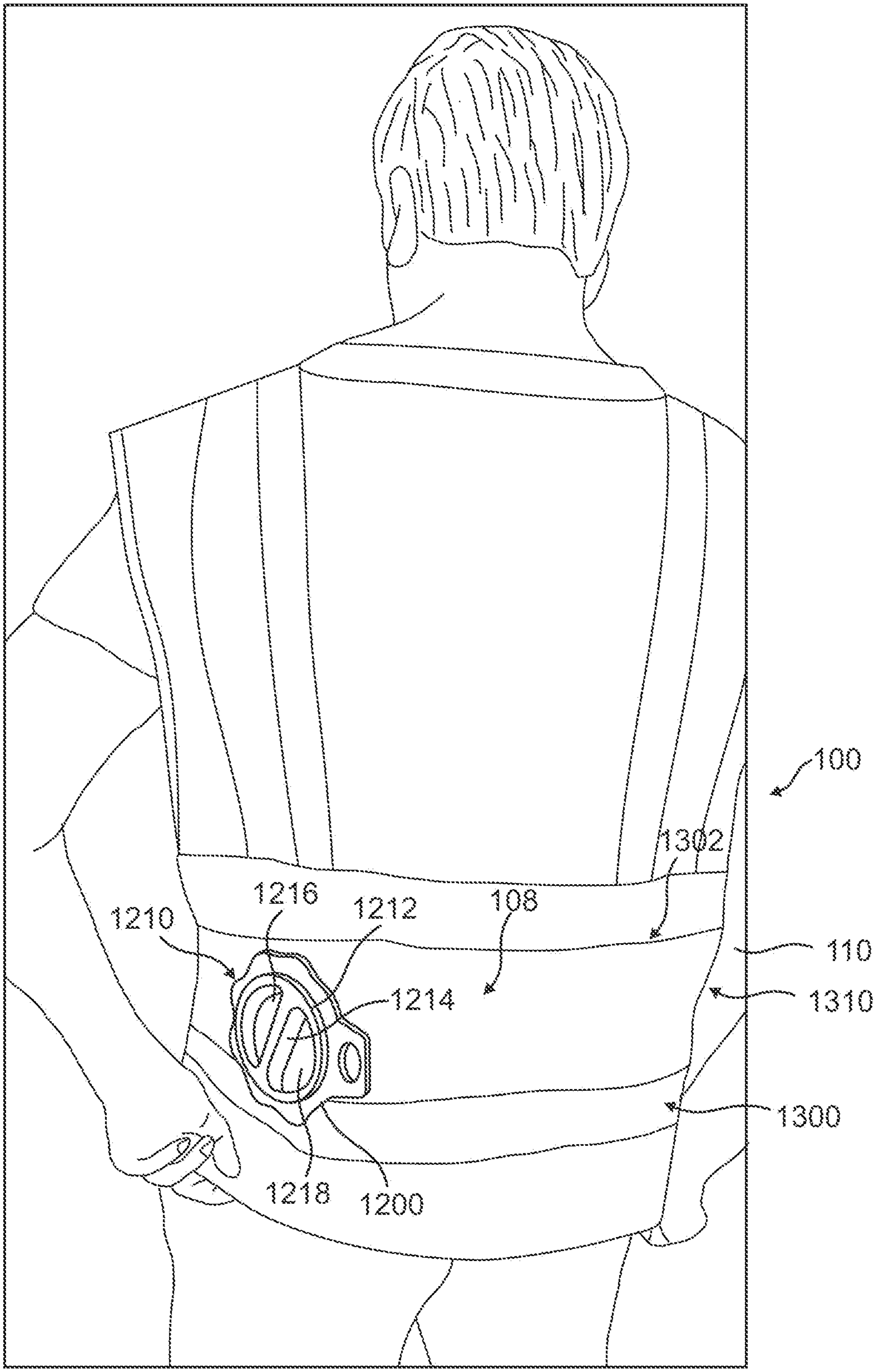
FIG. 13 is a rear perspective view of the improved personal cooling misting system with high visibility vest.

Referring to FIGS. 12 and 13, the improved personal cooling misting system also can be used for the high visibility vest. This embodiment contains snaps 1260 for closing and internal draw strings 1270 for securing the garment to a specific tightness on the body of the user.

Referring to FIGS. 12 and 13, the present invention has an easy fill opening 1200 in the back having a fill cap 1210 with a fill cap circumference 1212 with a fill cap handle 1214 that extends from one end of fill cap 1210 to an opposite end of fill cap 1210, one hundred and eighty (180) degrees away. On each side of fill cap handle 1214 are symmetrical concave sections 1216 and 1218 to allow for easy grasping of fill cap handle 1214. The bladder or fluid reservoir 108 is also located in the lower portion for stability. The easy fill opening 1200 allows a user to add water to the bladder or fluid reservoir 108 while wearing.

Referring to FIG. 13, the improved invention may also contain a back pouch 1300 adjacent easy fill opening 1200 with back pouch 1300 accessible via hook and loop fasteners 1310 to access an opening 1320 that contains pump 110 that is covered by a sound reduction pump container 1302 (not illustrated) made of fabric, nylon, cloth or similar material known with the industry and used for such purposes.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A personal cooling misting system comprising:

a) an articulating nozzle comprising:

an articulating nozzle first section that rotates 360 degrees in a first plane; and an articulating nozzle second section that rotates 360 degrees in a second plane;

wherein said articulating nozzle first section rotates in both a clockwise direction about a first axis and a counter clockwise direction about the first axis wherein said articulating nozzle second section rotates in both a clockwise direction about a second axis and a counter clockwise direction about the second axis;

wherein said articulating nozzle first section contains an integrally formed purge valve, a rotating valve knob, and a valve opening;

wherein said articulating nozzle second section is directly connected to a misting head;

b) a fluid reservoir having an interior volume to receive and house at least one fluid;

c) an electrically operated pump including an interior chamber surrounded by a first housing portion affixed to a second housing portion, said interior chamber housing an electronic circuit board and an internal source of power, and an access panel to accommodate access to the internal source of power;

d) a first feed tubing having a first feed tubing end coupled to said fluid in said fluid reservoir, the first feed tubing having a second feed tubing end coupled to and in fluid communication with said electrically operated pump;

e) a distributive tubing having a first distributive tubing end coupled to said electrically operated pump and at a location different from said second feed tubing end coupled to said electrically operated pump, the distributive tubing having a second distributive tubing end terminating in and coupled to said articulating nozzle;

wherein the distributive tubing a splits in two directions, a first direction continuing to the misting head and a second direction leading to a drinking line;

wherein said first plane is perpendicular to said second distributive tubing end and said second plane is perpendicular to said first plane;

wherein said electronic circuit board is configured to send commands to said electrically operated pump causing fluid to travel through the first feed tubing from the fluid reservoir to said electrically operated pump, said commands causing distributive fluid to travel through the distributive tubing from the electrically operated pump to the misting head, the commands causing the misting head to atomize the distributive fluid into misting fluid and cause the misting fluid to be variably actuated with a misting distribution pattern, with the misting distribution pattern exhibiting at least one of a constant misting emission or an intermittent misting emission;

f) a key fob to wirelessly communicate and manipulate said electrically operated pump;

g) a mechanical securing mechanism to secure said misting head to an article of clothing;

wherein a misting spray is configured to be sprayed from said misting head;

wherein said valve opening of said purge valve opens when said valve knob is rotated; and whereby said key fob controls the misting spray to be sprayed.

2. The personal cooling misting system in accordance with claim 1, wherein said valve opening of said purge valve has a diameter smaller than 0.5 inches.

3. The personal cooling misting system in accordance with claim 1, wherein said fluid is water.

4. A personal cooling misting system comprising:

a) an articulating nozzle;

wherein said articulating nozzle has an articulating nozzle first section that rotates 360 degrees in a first plane and an articulating nozzle second section that rotates 360 degrees in a second plane;

wherein said articulating nozzle first section contains an integrally formed purge valve, a rotating valve knob, and a valve opening;

wherein said articulating nozzle second section is directly connected to a misting head;

b) a fluid reservoir having an interior volume to receive and house at least one fluid;

c) an electrically operated pump including an interior chamber surrounded by a first housing portion affixed to a second housing portion, said interior chamber housing an electronic circuit board and an internal source of power, and an access panel to accommodate access to the internal source of power;

d) a first feed tubing having a first feed tubing end coupled to said first feed tubing coupling and in fluid communication with said fluid in said fluid reservoir, the first feed tubing having a second feed tubing end coupled to and in fluid communication with said electrically operated pump;

e) a distributive tubing having a first distributive tubing end coupled to said electrically operated pump and at a location different from said second feed tubing end, the distributive tubing having a second distributive tubing end terminating in and coupled to said articulating nozzle;

wherein said first plane is perpendicular to said second distributive tubing end and said second plane is perpendicular to said first plane;

wherein said electronic circuit board is configured to send commands to said electrically operated pump causing fluid to travel through the first feed tubing from the fluid reservoir to said electrically operated pump, said commands causing distributive fluid to travel through the distributive tubing from the electrically operated pump to the misting head, the commands causing the misting head to atomize the distributive fluid into misting fluid and cause the misting fluid to be variably actuated with a misting distribution pattern, with the misting distribution pattern exhibiting at least one of a constant misting or intermittent misting;

f) a key fob to wirelessly communicate and manipulate said electrically operated pump;

g) a mechanical securing mechanism to secure said misting head to an article of clothing;

wherein a misting spray is configured to be sprayed from said misting head;

wherein said valve opening of said purge valve opens when said valve knob is rotated; and whereby said key fob controls the misting spray to be.

5. The personal cooling misting system in accordance with claim 4, wherein said articulating nozzle first section rotates in both a clockwise direction about an axis and a counter clockwise direction about the axis.

6. The personal cooling misting system in accordance with claim 4, wherein said articulating nozzle second section rotates in both a clockwise direction about an axis and a counter clockwise direction about the axis.

7. The personal cooling misting system in accordance with claim 4, wherein said valve opening of said purge valve has a diameter smaller than 0.5 inches.

8. The personal cooling misting system in accordance with claim 4, wherein said fluid is water.

9. The personal cooling misting system in accordance with claim 4, wherein the distributive tubing splits in two directions, a first direction continuing to the misting head and a second direction leading to a drinking line.

10. A personal cooling misting system comprising:

a) an articulating nozzle comprising:

an articulating nozzle first section that rotates 360 degrees in a first plane; and an articulating nozzle second section that rotates 360 degrees in a second plane;

wherein said articulating nozzle first section contains an integrally formed purge valve, a rotating valve knob, and a valve opening;

wherein said articulating nozzle second section is directly connected to a misting head;

b) a fluid reservoir having an interior volume to receive and house at least one fluid;

c) an electrically operated pump including an interior chamber surrounded by a first housing portion affixed to a second housing portion, said interior chamber housing an electronic circuit board and an internal source of power, and an access panel to accommodate access to the internal source of power;

d) a first feed tubing having a first feed tubing end coupled to said first feed tubing coupling and in fluid communication with said fluid in said fluid reservoir, the first feed tubing having a second feed tubing end coupled to and in fluid communication with said electrically operated pump;

e) a distributive tubing having a first distributive tubing end coupled to said electrically operated pump and at a location different from said second feed tubing end, the distributive tubing having a second distributive tubing end terminating in and coupled to said articulating nozzle;

wherein said first plane is perpendicular to said second distributive tubing end and said second plane is perpendicular to said first plane;

wherein said electronic circuit board is configured to send commands to said electrically operated pump causing fluid to travel through the first feed tubing from the fluid reservoir to said electrically operated pump, said commands causing distributive fluid to travel through the distributive tubing from the electrically operated pump to the misting head, the commands causing the misting head to atomize the distributive fluid into misting fluid and cause the misting fluid to be variably actuated with a misting distribution pattern, with the misting distribution pattern exhibiting at least one of a constant misting or intermittent misting;

f) a key fob to wirelessly communicate and manipulate said electrically operated pump;

wherein a misting spray is configured to be sprayed from said misting head;

wherein said valve opening of said purge valve opens when said valve knob is rotated; and whereby said key fob controls the misting spray to be.

11. The personal cooling misting system in accordance with claim 10, wherein said articulating nozzle first section rotates in both a clockwise direction about a first axis and a counter clockwise direction about the first axis.

12. The personal cooling misting system in accordance with claim 10, wherein said articulating nozzle second section rotates in both a clockwise direction about a second axis and a counter clockwise direction about the second axis.

13. The personal cooling misting system in accordance with claim 10, wherein said valve opening of said purge valve has a diameter smaller than 0.5 inches.

14. The personal cooling misting system in accordance with claim 10, wherein said fluid is water.

15. The personal cooling misting system in accordance with claim 11, wherein said fluid is water.

16. The personal cooling misting system in accordance with claim 10, wherein said valve opening of said purge valve opens when said valve knob is rotated.

17. The personal cooling misting system in accordance with claim 10, wherein the distributive tubing splits in two directions, a first direction continuing to the misting head and a second direction leading to a drinking line.

* * * * *